United States Patent
Chen et al.

(10) Patent No.: US 11,604,982 B2
(45) Date of Patent: Mar. 14, 2023

(54) PROGRESSIVE MODELING OF OPTICAL SENSOR DATA TRANSFORMATION NEURAL NETWORKS FOR DOWNHOLE FLUID ANALYSIS

(71) Applicant: HALLIBURTON ENERGY SERVICES, INC., Houston, TX (US)

(72) Inventors: Dingding Chen, Tomball, TX (US); Christopher Michael Jones, Houston, TX (US); Bin Dai, Spring, TX (US); Anthony Van Zuilekom, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 698 days.

(21) Appl. No.: 16/598,802

(22) Filed: Oct. 10, 2019

(65) Prior Publication Data
US 2021/0110246 A1    Apr. 15, 2021

(51) Int. Cl.
*G06N 3/045* (2023.01)
*G06N 3/08* (2023.01)

(52) U.S. Cl.
CPC .............. *G06N 3/08* (2013.01); *G06N 3/045* (2023.01)

(58) Field of Classification Search
CPC ........ G06N 3/08; G06N 3/0454; G06N 3/084; G06N 3/067; G06N 3/045
See application file for complete search history.

(56) References Cited

U.S. PATENT DOCUMENTS

| | | | |
|---|---|---|---|
| 7,966,273 B2 | 6/2011 | Hegeman et al. | |
| 9,702,248 B2 | 7/2017 | Chen et al. | |
| 2016/0177715 A1 | 6/2016 | Indo et al. | |
| 2017/0261640 A1* | 9/2017 | Chen | E21B 47/113 |
| 2017/0269260 A1 | 9/2017 | Chen et al. | |
| 2019/0120049 A1 | 4/2019 | Chen et al. | |
| 2021/0102889 A1* | 4/2021 | Brauer | G01N 21/3504 |

OTHER PUBLICATIONS

International Search Report and Written Opinion for International application No. PCT/US2019/055876, dated Jul. 6, 2020, 10 pages.

* cited by examiner

*Primary Examiner* — Marcos L Torres
(74) *Attorney, Agent, or Firm* — Novak Druce Carroll LLP (57) ABSTRACT

Disclosed herein are examples embodiments of a progressive modeling scheme to enhance optical sensor transformation networks using both in-field sensor measurements and simulation data. In one aspect, a method includes receiving optical sensor measurements generated by one or more downhole optical sensors in a wellbore; determining synthetic data for fluid characterization using an adaptive model and the optical sensor measurements; and applying the synthetic data to determine one or more physical properties of a fluid in the wellbore for which the optical sensor measurements are received.

21 Claims, 7 Drawing Sheets

PROGRESSIVE MODELING OF OPTICAL SENSOR DATA TRANSFORMATION NEURAL NETWORKS FOR DOWNHOLE FLUID ANALYSIS

TECHNICAL FIELD

The present technology pertains to improvements in characterization of fluids present in hydrocarbon wellbores. In particular, the present disclosure relates to improvements in modeling of sensor data transformation neural networks utilized in characterization of fluids present in such hydrocarbon wellbores.

BACKGROUND

When performing subterranean operations in wellbores, it is often desirable to obtain information about subterranean formations and fluids present therein through well logging and fluid sampling analysis. Robust downhole fluid analysis highly relies on quality measurements and data mapping from various optical sensors implemented into modern formation testers. The direct modeling used to determine a multivariate correlation between optical sensor responses and diverse fluid compositions or properties is often cost-prohibitive with sensor-based calibration.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the example embodiments described herein. However, it will be understood by those of ordinary skill in the art that the example embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the example embodiments described herein.

As noted above, robust downhole fluid analysis highly relies on quality measurements and data mapping from various optical sensors implemented into modern formation testers. The direct modeling used to determine a multivariate correlation between optical sensor responses and diverse fluid compositions or properties is often cost-prohibitive with sensor-based calibration. The present disclosure provides examples embodiments of a progressive modeling scheme to enhance optical sensor transformation neural networks using both in-field sensor measurements and simulation data. The disclosure begins with a description of an example downhole operating environment in which multiple optical sensors may be utilized to measure and collect data on downhole fluids, which can then be input into a concatenated computing neural network for fluid characterization.

Figure 1A:
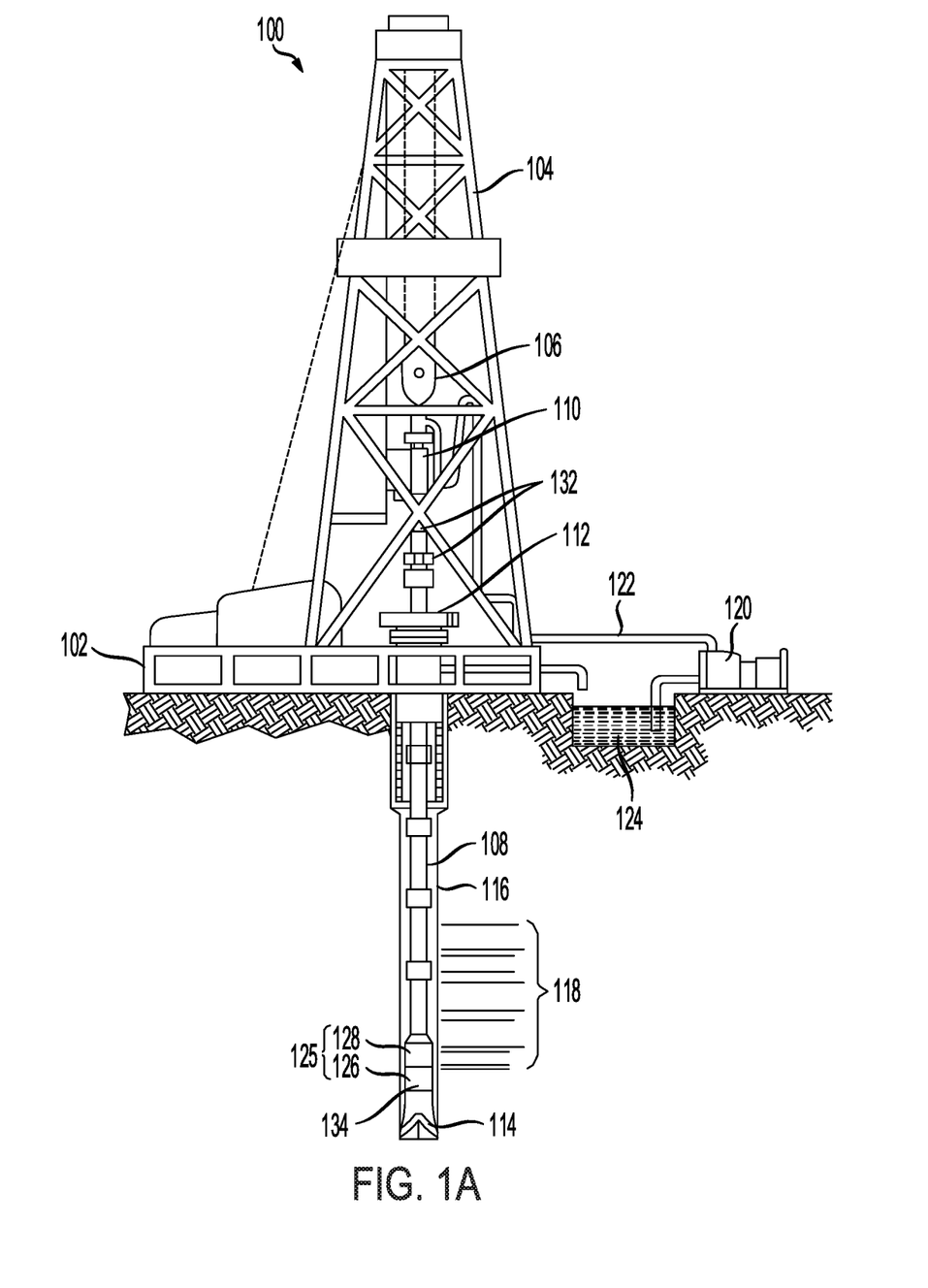
FIG. 1A illustrates a schematic view of a logging while drilling (LWD) wellbore operating environment, according to one aspect of the present disclosure.

The disclosure now turns to FIG. 1A, which illustrates a schematic view of a logging while drilling (LWD) wellbore operating environment 100 according to one aspect of the present disclosure. As depicted in FIG. 1A, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various formations 118. A pump 120 circulates drilling fluid through a supply pipe 122 to top drive 110, down through the interior of drill string 108 and orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 (which may be the same as optical tool 156 described below with reference to FIG. 1B a) collect measurements relating to various formation properties as well as the orientation of the tool and various other drilling conditions. The bottom-hole assembly 125 may also include a telemetry sub 128 to transfer measurement data to a surface receiver 132 and to receive commands from the surface (e.g., logging facility 160 described below with reference to FIG. 1B). In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled with one or more wires and/or other media. The logging tools 126 may also include one or more computing devices 134 communicatively coupled with one or more of the one or more tool components by one or more wires and/or other media. The one or more computing devices 134 may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drillpipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drillpipe.

Figure 1B:
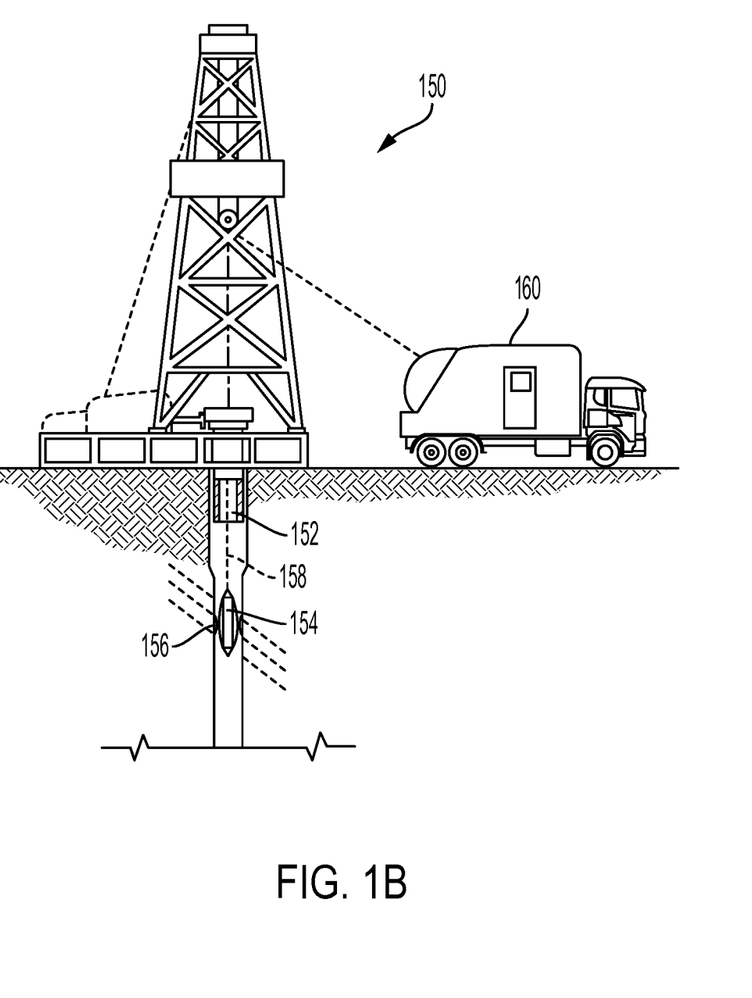
FIG. 1B illustrates a wellbore operating environment of a downhole tool, according to one aspect of the present disclosure.

Referring to FIG. 1B, an example system 140 for downhole line detection in a downhole environment having tubulars can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a wireline conveyance 144 can be used. The tool body 146 can include a resistivity logging tool. The tool body 146 can be lowered into the wellbore 116 by wireline conveyance 144. The wireline conveyance 144 can be anchored in the drill rig 145 or a portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 provides support for the tool, as well as enabling communication between tool processors 148A-N on the surface and providing a power supply. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

FIG. 1B illustrates a wellbore operating environment of a downhole tool, according to one aspect of the present disclosure. As shown in FIG. 1, environment 150 includes wellbore 152. Downhole system 154 having one or more optical tools 156 may be used to log information including, but not limited to, subterranean formation of fluids, rocks, etc. Such tools may be utilized to sample, test and/or otherwise obtain information on subterranean formation of fluids.

Optical tools 156 may be attached to downhole system 154 via conveyance 158 (often referred to as wireline in the field), which can be a wires (one or more wires), slicklines, cables, or the like, as well as tubular conveyances such as wired or unwired coiled tubing, joint tubing, or other tubulars, and may include a downhole tractor. conveyance 158 may have other logging tools attached thereto in addition to optical tools 156.

Optical tools 156 may include one or more optical sensors installed with one or more optical channels and may be communicatively coupled to conveyance 158. Conveyance 158 may contain conductors for transporting power to downhole system 154 and telemetry from optical tools 156 to logging facility 160. Alternatively conveyance 158 may be a slickline or coiled tubing, which may lack a conductor. In such case, downhole system 154 may have an associated control unit that contains one or more memories, one or more batteries, and/or one or more processors for operating downhole system 154 and storing measurements by optical tools 156.

Logging facility 160 may collect measurements from optical tools 156 and may include computing facilities for controlling, processing, and/or storing measurements collected by optical tools 156. Logging facility 160 (computing facilities thereof) may be communicatively coupled to downhole system 154 and optical tools 156.

In addition to deployment in a drilling environment, as described above with reference to FIG. 1A, logging tool 126 and/or optical tools 156 described above can also be deployed and used in a permanent completion environment as well. Such logging tool 126 and/or optical tools 156 can be placed along the length of the wellbore or tubular in such permanent completions to provide monitoring of the wellbore over a long period of time, such as 1-5 years, IA 0 years, etc.

With example well operating environment described with reference to FIGS. 1A and 1B, the disclosure now turns to description of an example adaptive model that can be utilized in characterizing formation fluid under downhole operating environment 150 of FIG. 1, with measurements by optical tools 156 provided as inputs into such environment 150. An adaptive model can be any one of concatenated neural networks, genetic algorithms, evolutionary methods, reinforcement learning, bootstrap aggregating, temporal difference learning, w-nets, growing self-organizing maps, etc. A non-limiting example of an adaptive model, a concatenated optical computing neural network (or simply a concatenated neural network) will be described below with reference to FIG. 2.

Figure 2:
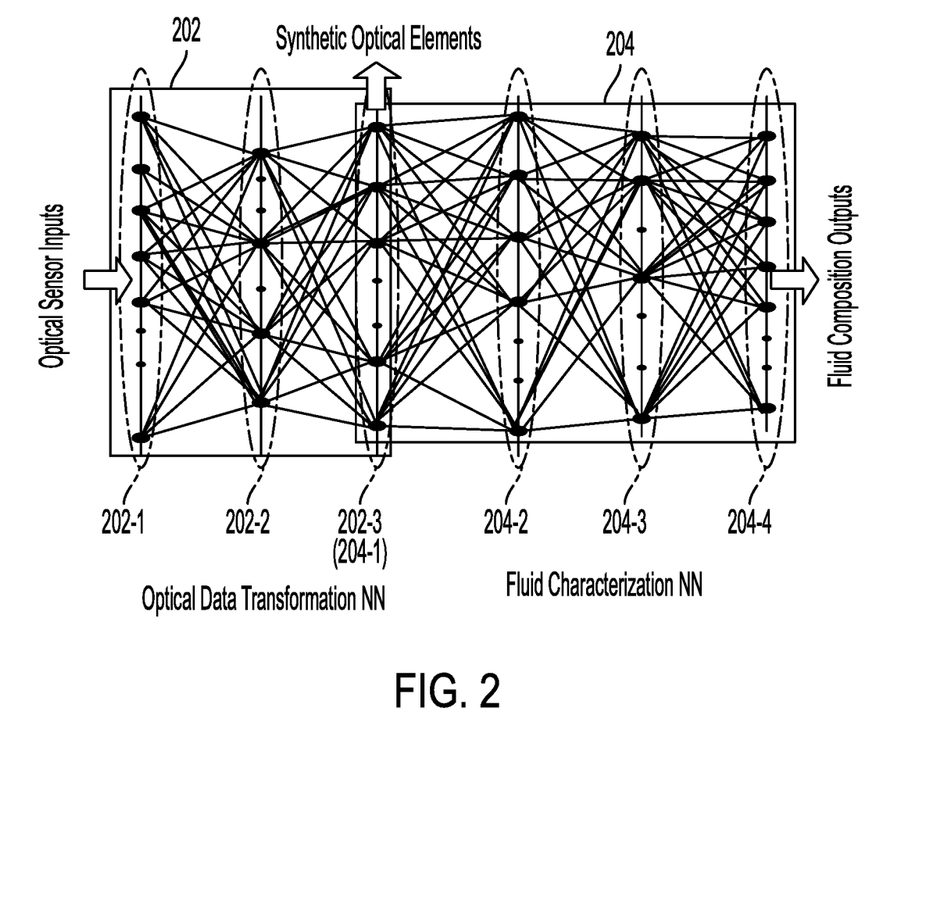
FIG. 2 is an example concatenated optical computing neural network for characterizing downhole fluids, according to one aspect of the present disclosure.

FIG. 2 is an example concatenated optical computing neural network for characterizing downhole fluids, according to one aspect of the present disclosure. Concatenated Optical Computing Neural Network (COCN) structure 200 of FIG. 2 consists of an optical data transformation neural network (first network) 202 and a fluid characterization neural network (second network) 204. In one example, synthetic optical outputs of first network 202 are the primary inputs of second network 204. Both neural networks deploy multi-layer perceptron (MLP) architecture, and both neural networks are implemented with multi-input and multi-output (MIMO) structure.

In one example, optical data transformation neural network 202 includes an input layer 202-1, a single hidden layer 202-2, and an output layer 202-3. Input layer 202-1 may have n inputs with n being an integer greater than or equal to 2. Number of nodes of hidden layer 202-2 and number outputs of output layer 202-3 may be the same or different (more or less) than number of inputs n of input layer 202-1.

In one example, fluid characterization neural network 204 includes an input layer 204-1, two hidden layers 204-2 and 204-3, and an output layer 204-4. Input layer 204-1, as will be described below, may be the output layer 202-3 of optical data transformation neural network 202. Number of nodes of hidden layers 204-2 and 204-3 and number outputs of output layer 204-4 may be the same or different (more or less) than number of inputs of input layer 204-1.

Fluid characterization neural network 204 may be a multi-analyte fluid characterization neural network with a non-limiting example of 4,000 fluid optical absorbance spectra measured on diverse hydrocarbons (e.g., oil and gas) samples under standard Pressure/Volume/Temperature (PVT) laboratory conditions, along with matched fluid composition and property data. In one example, absorbance spectra of the samples are first transformed to transmittance spectra, which are consistent with the optical sensor responses, and then processed with a Principle Component Analysis (PCA) routine to obtain dimension-reduced Principle Spectroscopy Component (PSC) data. Fluid characterization neural network 204 implemented with a MIMO structure share the same neural network connecting coefficients on the input and hidden layers, making fluid compositional outputs well balanced by minimizing single congregated cost function through neural network training.

In one example, training of fluid characterization neural network 204 is based on an in-house database. About 20 candidate PSC inputs (e.g., synthetic optical elements shown in FIG. 2) may be used with temperature, pressure, and fluid density data and processed with an input-selection routine to optimize prediction of COCN multi-analyte outputs. During the input selection, a backward stepwise learning algorithm may be applied, and a member neural network model base with variable input may be constructed. Following the backward stepwise input selection workflow, fluid characterization neural network 204 may be calibrated with the full candidate inputs first. Then, the least significant input is removed step-by-step through neural network performance evaluation. At each step, candidate neural networks trained with the best remaining candidate inputs and varied data partition may be stored as candidate member neural networks in a model base (stored at a memory associated with logging facility 160, for example). The final COCN outputs are predicted with an example 12-member network ensemble having member neural network structure varied from a maximum to a minimum number of inputs.

Candidate fluid characterization neural networks to be used as fluid characterization neural network 204 may contain 30 neurons in the first hidden layer 204-2 and 20 neurons in the second hidden layer 204-3. Candidate fluid characterization neural networks may be trained with a Bayesian regularization algorithm, having capability to generalize well on newly received sensor data.

Figure 3:
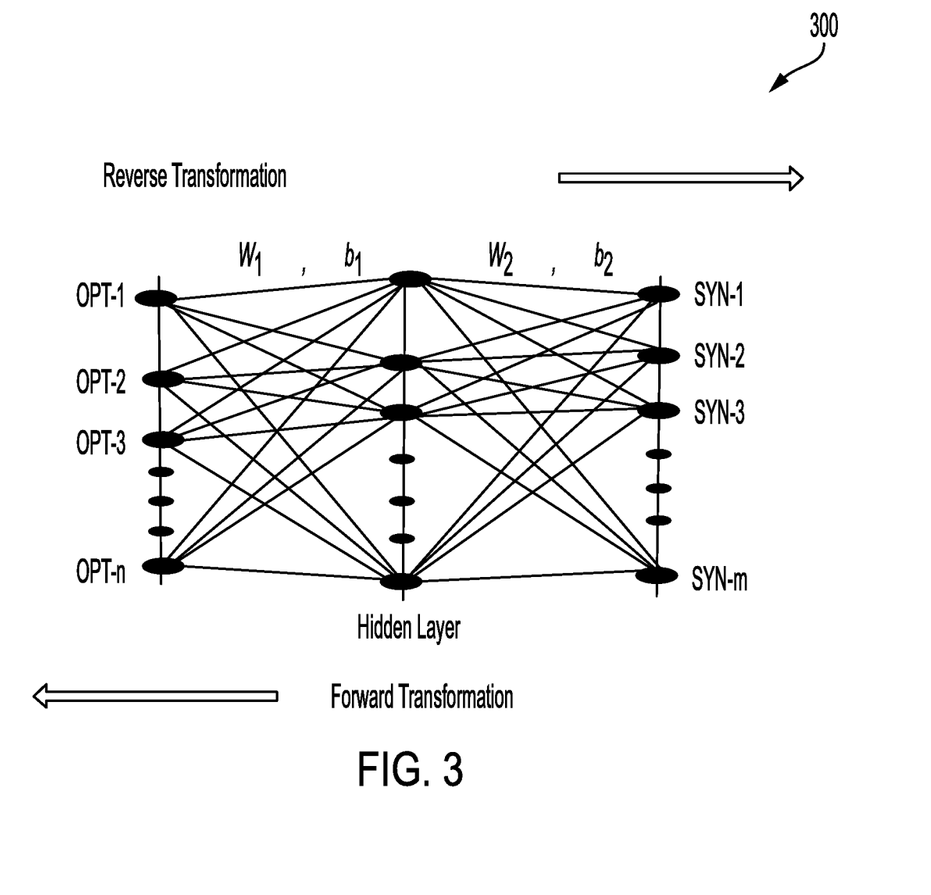
FIG. 3 illustrates an example structure of an optical data transformation neural network used in concatenated neural network of FIG. 2, according to one aspect of the present disclosure.

Optical data transformation neural network 202 will be described next with reference to FIG. 3. FIG. 3 illustrates an example structure of an optical data transformation neural network used in concatenated neural network of FIG. 2, according to one aspect of the present disclosure. As compared to fluid characterization neural networks calibrated on a large database, the optical data transformation neural networks are usually calibrated on a small number of reference fluids, which undermines the quality of data mapping with new field measurements by optical tools 156. To overcome the limitation with sparse calibration data for optical data transformation neural networks, mutually complementing modeling and testing technique may be applied, as will be described below.

FIG. 3 illustrates an optical data transformation neural network structure 300 that enables two-directional data mapping. Reverse transformation neural network may convert optical sensor measurements (OPT) to synthetic optical responses (SYN). Forward transformation neural networks simulate optical sensor responses (OPT) using synthetic optical inputs (SYN). Reverse and forward transformation neural networks form two groups of mutually complementing models that can validate one another. The output parameters in one group can be estimated from the inputs from the other group. Reverse transformation neural networks (SYN predictive) used to evaluate predictions of forward transformation neural networks for optical sensor data reconstruction is the primary application during calibration. Forward transformation neural networks (OPT predictive) can also be used to evaluate data mapping of reverse transformation neural networks for synthetic optical parameter reconstruction in the field application if applied reversely.

As can be seen from FIG. 3, in the forward transformation stage, optical sensor measurements ($OPT_1, \ldots, OPT_n$) are predicted based on synthetic optical measurements ($SYN_1, \ldots, SYN_n$) with weights ($W_1, W_2, \ldots$) and biases ($b_1, b_2, \ldots$) applied thereto. On the other hand, during reverse transformation stage, $SYN_1, \ldots, SYN_n$ are predicted based on $OPT_1, \ldots, OPT_n$.

Both reverse and forward transformation neural networks are calibrated in in-house databases. The initial calibrations are performed on a small number of reference fluids using measured optical sensor responses and computed synthetic optical responses as calibration data pairs.

Figure 4:
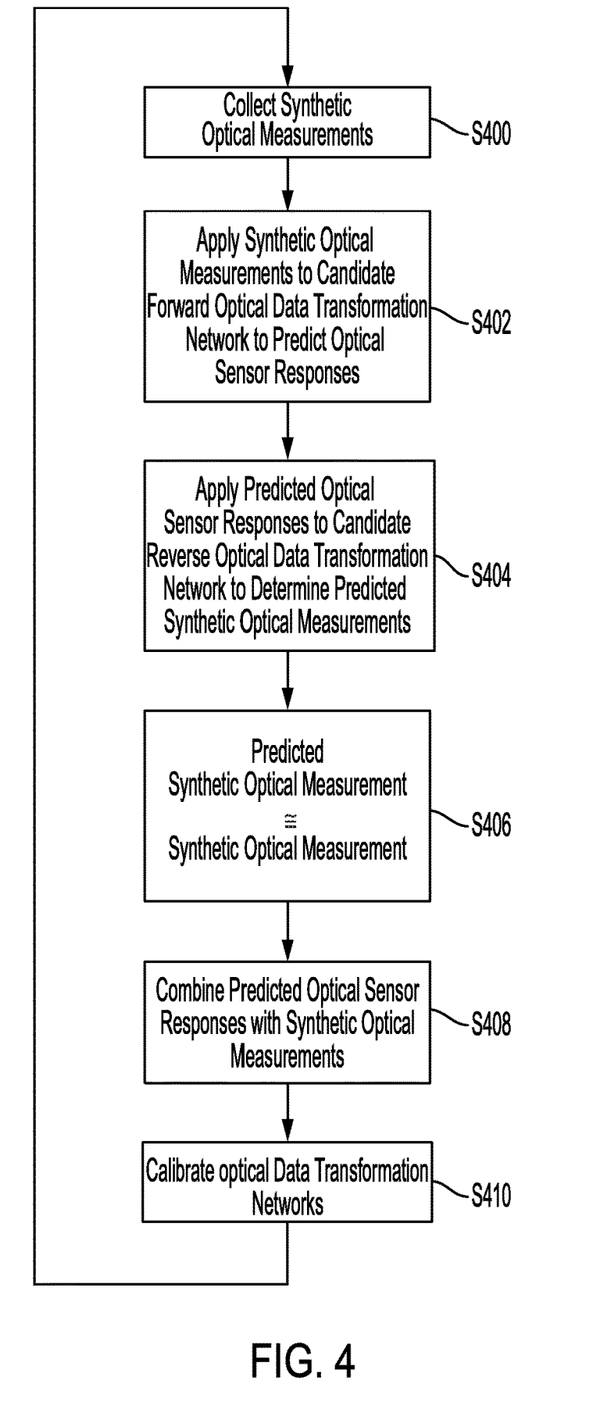
FIG. 4 illustrates an example method of calibrating the optical data transformation neural network of FIG. 3, according to one aspect of the present disclosure.

Prior to utilization of COCN 200 of FIG. 2 for fluid characterization in field, COCN 200 should be calibrated first in a laboratory setting. FIG. 4 describes a progressive modeling process for calibrating optical data transformation neural network 202 to be used in COCN 200 for fluid characterization.

FIG. 4 illustrates an example method of calibrating the optical data transformation neural network of FIG. 3 (which is a part of COCN of FIG. 2), according to one aspect of the present disclosure. FIG. 4 will be described from a perspective of logging facility 160. However, it will be understood that logging facility 160 may include one or more terminals having one or more associated processors executing computer-readable instructions to implement the method of FIG. 4. Alternatively, such terminal may be at a remote site or facility such as in-house laboratory instead of logging facility 160. Example structure of a terminal implementing method of FIG. 4 will be described with reference to FIGS. 6A-B.

For calibrating optical data transformation neural network 202 of COCN 200, two in-house data bases are utilized. First database is an optical sensor signal transformation database comprising measured optical sensor responses on the selected reference fluids, and the second database is a standard PVT database comprising of synthetic or generic sensor responses and fluid compositions and properties on a large variety of reservoir and house-made fluids. The initial calibrations are performed on a small number of reference fluids using measured optical sensor responses and computed synthetic optical responses as calibration data pairs. The typical reference fluids may include representative dead oil, live oil, methane, nitrogen, water, and some non-petroleum fluids such as toluene, pentanediol, and dodecane to cover a reasonable dynamic range for calibration analysis. The measurement data for each fluid are collected under different setting temperatures and pressures over a period of time, and the initial reverse and forward transformation networks are calibrated with a large number of resampled noisy data to minimize any issue associated with sparse fluid samples.

At S400, after initial transformation networks are built, logging facility 160 may collect (receive) synthetic optical measurements unseen during initial calibration from a large number of fluid samples from the second (PVT) database stored in a memory accessible by a processor.

At S402, logging facility 160, may apply the received synthetic optical measurements to a forward optical data transformation network to predict optical sensor responses. The calibrated forward transformation network may use full potential inputs of synthetic optical responses in this application which enables all candidate inputs available in calibrating generic fluid characterization networks. However, the implementation of the forward optical data transformation is not limited to single network realization. Different candidate networks can be constructed during calibration by varying partitions of the training, validation and testing data sets, or changing the number of nodes on the hidden layer. In practice, for example, forward optical data transformation is averaged over the outputs of three member networks to predict optical sensor responses.

At S404, logging facility 160 may apply the predicted optical sensor responses of the forward optical data transformation neural network to a candidate reverse optical data transformation neural network to determine predicted synthetic optical measurements. The candidate reverse transformation networks can be calibrated with either full inputs or selected inputs of measured and simulated optical sensor responses. Similar backward stepwise input selection procedure can be applied for optical sensor input optimization to remove redundant optical channel responses. Some elements that have detected issue during sensor data diagnostic analysis can also be removed from the calibration of reverse transformation networks. To reduce the uncertainty of data mapping, the ensemble network realization are applied to both forward and reverse transformation in general allowing flexible software implementations.

At S406, predicted synthetic optical measurements of S404 may be compared with synthetic optical measurements received at S400. If predicted synthetic optical measurements of S404 and synthetic optical measurements of S400 are equal or within a threshold of one another (where such threshold may be determined based on experiments and/or empirical studies), then at S408, predicted optical sensor responses of S402 may be combined with synthetic optical measurements of the fluid samples received at S400 to form new calibration data integrated with measured and simulated optical sensor responses. In one example, when initial optical data transformation networks calibrated on a small number of reference fluids are tested on a large number of unseen synthetic optical inputs, only part of these inputs will generate validated optical sensor responses that meet testing criteria after reverse transformation. Combining measurement and simulation data at S408 requires sorting synthetic optical data prediction and selecting the validated new data pairs for the next calibration. This process may iterate multiple times and hence may be referred to as progressive modeling.

Thereafter, at S410, logging facility 160 may enhance calibration of optical data transformation neural networks in the expanded optical sensor signal transformation database with the updated calibration data (e.g., the initial optical sensor measurements on the reference fluids and the validated sensor simulation responses through S402, S404 and S406 may be combined with corresponding synthetic optical measurements of the fluid samples received at S400). After the new transformation networks are constructed, the steps starting from S400 may repeat. The synthetic optical data in the PVT database used to test new optical data transformation networks may be the information available in the entire database. However, in one example, the validated simulation data of the optical sensor responses on the increased number of fluids that can be integrated for the use in the next calibration will still be limited compared to the size of available synthetic optical data in the PVT database. Although it is beneficial for field application if different candidate transformation networks with inclusion of simulated optical sensor data in different degrees are available, in one example, the overuse of simulation data can be avoided to prevent the optical data transformation from the lack of measurement background.

The above process of FIG. 4 may be referred to as a progressive modeling scheme for calibrating concatenated neural networks such as COCN 200 of FIG. 2. With an example method of calibrating optical data transformation neural networks and hence COCN with reference to FIG. 4, the disclosure now turns to description of an example method of using calibrated COCN for in-field fluid characterization.

Figure 5:
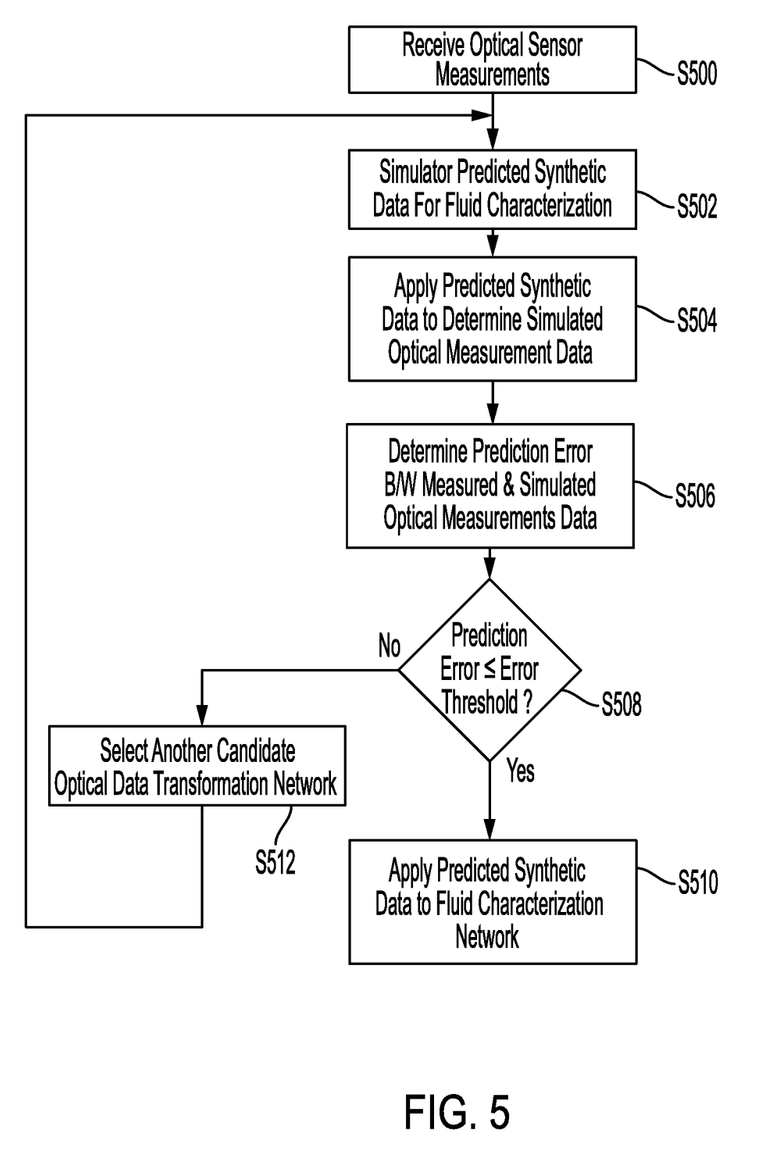
FIG. 5 illustrates an example field application flowchart of concatenated optical computing neural network of FIG. 2, according to one aspect of the present disclosure.

FIG. 5 illustrates an example method of using concatenated computing neural network of FIG. 2 for downhole fluid characterization, according to one aspect of the present disclosure. FIG. 5 will be described from a perspective of logging facility 160. However, it will be understood that logging facility 160 may include one or more terminals having one or more associated processors executing computer-readable instructions to implement the method of FIG. 5. Alternatively, such terminal may be at a remote site or facility instead of logging facility 160. Example structure of a terminal implementing method of FIG. 5 will be described with reference to FIGS. 6A-B. With reference to FIG. 5, it is assumed that calibrated COCN 200 is applied to actual optical sensor measurements (OPT) from downhole optical tool 156 installed inside wellbore 152.

At S500, logging facility 160 may receive optical sensor measurements (OPT) from optical sensors 156 in wellbore 152. The optical sensor measurements may be generated by optical sensors 156 according to any known or to be developed method.

At S502, logging facility 160 may simulate synthetic data SYN for fluid characterization using a candidate pre-calibrated reverse optical data transformation neural network and the received OPT data at S500. The output of this step may be referred to as predicted SYN data.

At S504, logging facility 160 may apply predicted SYN data to a candidate pre-calibrated forward optical data transformation neural network to obtain simulated optical sensor measurements data, which may be referred to as simulated OPT data. At S506, logging facility 160 may determine a prediction error between measured OPT data received at S500 and simulated OPT data of S504.

At S508, logging facility 160 determines if the prediction error is less than or equal to an error threshold, which may be a configurable parameter determined based on experiments and/or empirical studies. If at S508, logging facility 160 determines that the prediction error is less than or equal to the error threshold, then at S510, logging facility 160 applies predicted SYN data (which corresponds to output of first (optical data transformation neural network) 202 of FIG. 2) as input to fluid characterization neural network 204 of FIG. 2 to predict fluid composition and properties of fluid for which OPT data is received at S500.

If at S508, logging facility 160 determines that the prediction error is not less than or equal to the error threshold, then at S512, logging facility 160 selects other candidate forward and reverse optical data transformation neural networks and repeats S502 to S508 until a candidate optical data transformation neural network resulting in prediction error being less than or equal to the error threshold is obtained.

With example embodiments of calibrating COCNs and applying the same to field data for fluid characterization, the disclosure now turns to example computing systems and architecture that can be utilized as terminals at logging facility 160 or elsewhere for implementing methods of FIGS. 4 and 5.

Figure 6A:
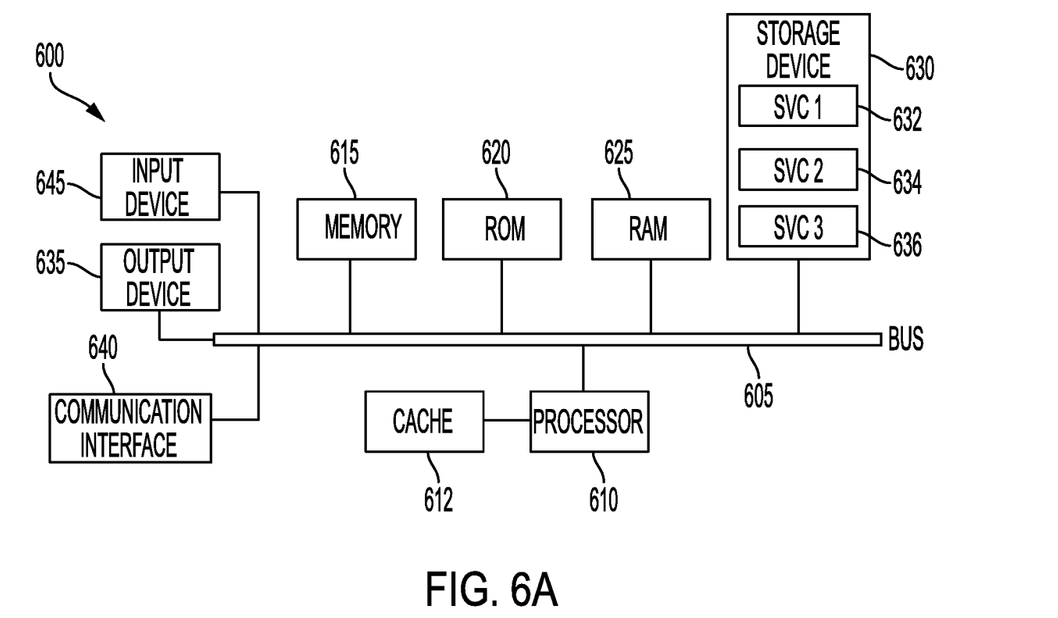
FIGS. 6A-B illustrate example system architectures for implementing methods of FIGS. 4 and 5, according to one aspect of the present disclosure.
Figure 6B:
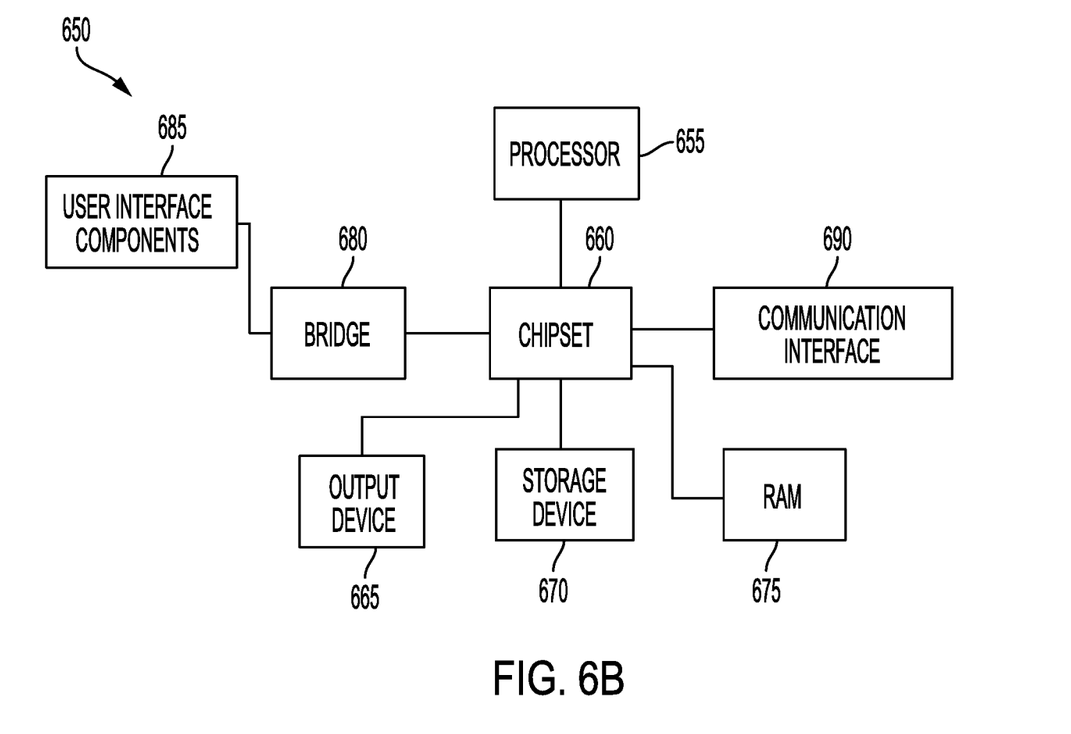

FIGS. 6A-B illustrate example system architectures for implementing methods of FIGS. 4 and 5, according to one aspect of the present disclosure. FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as SERVICE (SVC) 1 632, SERVICE (SVC) 2 634, and SERVICE (SVC) 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software services 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Numerous examples are provided herein to enhance understanding of the present disclosure. A specific set of statements are provided as follows.

STATEMENTS OF THE DISCLOSURE INCLUDE

Statement 1: A method includes receiving optical sensor measurements generated by one or more downhole optical sensors in a wellbore; determining synthetic data for fluid characterization using an adaptive model and the optical sensor measurements; and applying the synthetic data to determine one or more physical properties of a fluid in the wellbore for which the optical sensor measurements are received.

Statement 2: The method of statement 1, wherein determining the synthetic data includes selecting, as the adaptive model, a candidate reverse optical data transformation neural network and a candidate forward optical data transformation neural network from a model base of optical data transformation neural networks; applying the optical sensor measurements to the candidate reverse optical data transformation neural network to yield simulated synthetic data; applying the simulated synthetic data to the candidate forward optical data transformation neural network to yield simulated optical measurement data; and selecting the simulated synthetic data as the synthetic data based on a prediction error between the simulated optical measurement data and the optical sensor measurements.

Statement 3: The method of statement 2, wherein if the prediction error is equal to or less than a threshold, the simulated synthetic data is selected as the synthetic data for determining the one or more physical properties of the fluid.

Statement 4: The method of statement 2, wherein if the prediction error is more than a threshold, the method further includes iteratively selecting further candidate reverse optical data transformation neural networks and candidate forward optical data transformation neural networks and repeating steps of applying the optical sensor measurements, applying the simulated synthetic data and selecting the simulated synthetic data until the prediction error is equal to or less than the threshold.

Statement 5: The method of statement 1, wherein the adaptive model includes a fluid characterization neural network and an optical data transformation neural network; and the synthetic data is applied as input to the pre-calibrated fluid characterization neural network to receive, as output the one or more physical properties of the fluid.

Statement 6: The method of statement 5, wherein the adaptive model is pre-calibrated in a laboratory setting.

Statement 7: The method of statement 6, wherein pre-calibrating the adaptive model comprises calibrating the optical data transformation neural network.

Statement 8: The method of statement 7, wherein the pre-calibrating includes applying a progressive modeling to calibrate forward and reverse optical data transformation neural networks.

Statement 9: The method of statement 8, wherein the progressive modeling includes applying a subset of synthetic optical measurements to a forward optical data transformation neural network to generate predicted optical measurement responses; using the predicted optical measurement responses to generate predicted synthetic optical measurements; and based on a comparison of the predicted synthetic optical measurements and the subset of synthetic optical measurements, generate calibration data for calibrating candidate optical data transformation neural networks.

Statement 10: The method of statement 5, wherein the fluid characterization neural network had two hidden layers and the optical data transformation neural network has a single hidden layer.

Statement 11: A device includes memory having computer-readable instructions stored therein; and one or more processors configured to execute computer-readable instructions to receive optical sensor measurements generated by one or more downhole optical sensors in a wellbore; determine synthetic data for fluid characterization using an adaptive model and the optical sensor measurements; and apply the synthetic data to determine one or more physical properties of a fluid in the wellbore for which the optical sensor measurements are received.

Statement 12: The device of statement 11, wherein the one or more processors are configured to further execute the computer-readable instructions to select, as the adaptive model, a candidate reverse optical data transformation neural network and a candidate forward optical data transformation neural network from a model base of optical data transformation neural networks; apply the optical sensor measurements to the candidate reverse optical data transformation neural network to yield simulated synthetic data; apply the simulated synthetic data to the candidate forward optical data transformation neural network to yield simulated optical measurement data; and select the simulated synthetic data as the synthetic data based on a prediction error between the simulated optical measurement data and the optical sensor measurements.

Statement 13: The device of statement 12, wherein if the prediction error is equal to or less than a threshold, the simulated synthetic data is selected as the synthetic data for determining the one or more physical properties of the fluid.

Statement 14: The device of statement 12, wherein if the prediction error is more than a threshold, the one or more processors are configured to further execute the computer-readable instructions to iteratively select further candidate reverse optical data transformation neural networks and candidate forward optical data transformation neural networks and repeat steps of applying the optical sensor measurements, applying the simulated synthetic data and selecting the simulated synthetic data until the prediction error is equal to or less than the threshold.

Statement 15: The device of statement 11, wherein the adaptive model comprises a fluid characterization neural network and an optical data transformation neural network; and the synthetic data is applied as input to the pre-calibrated fluid characterization neural network to receive, as output the one or more physical properties of the fluid.

Statement 16: The device of statement 15, wherein the adaptive model is pre-calibrated in a laboratory setting.

Statement 17: The device of statement 16, wherein the one or more processors are configured to further execute the computer-readable instructions to pre-calibrate the adaptive model by calibrating the optical data transformation neural network.

Statement 18: The device of statement 17, wherein the one or more processors are configured to further execute the computer-readable instructions to apply a progressive modeling to calibrate forward and reverse optical data transformation neural networks.

Statement 19: The device of statement 18, wherein the progressive modeling includes applying a subset of synthetic optical measurements to a forward optical data transformation neural network to generate predicted optical measurement responses; using the predicted optical measurement responses to generate predicted synthetic optical measurements; and based on a comparison of the predicted synthetic optical measurements and the subset of synthetic optical measurements, generate calibration data for calibrating candidate optical data transformation neural networks.

Statement 20: The device of statement 11, wherein the one or more optical sensors are communicatively coupled to the device.

Statement 21: The device of statement 11, wherein the adaptive model can be at least one of a concatenated neural network, a genetic algorithm, an evolutionary method, a reinforcement learning, a bootstrap aggregating, a temporal difference learning, a w-net, or a growing self-organizing map.

What is claimed is:

1. A method, comprising:
applying a subset of synthetic optical measurements to an optical data transformation of an adaptive model to identify predicted optical sensor responses;
applying the predicted optical sensor responses to identify predicted synthetic optical measurements;
generating calibration data for calibrating the optical data transformation of the adaptive model based on a comparison of the predicted synthetic optical measurements and the subset of synthetic optical measurement responses;
receiving optical sensor measurements generated by one or more downhole optical sensors in a wellbore;
applying the adaptive model and the optical sensor measurements to determine synthetic data for fluid characterization; and
applying the synthetic data to determine one or more physical properties of a fluid in the wellbore for which the optical sensor measurements are received.

2. The method of claim 1, wherein determining the synthetic data comprises:
selecting, as the adaptive model, a candidate reverse optical data transformation neural network and a candidate forward optical data transformation neural network from a model base of optical data transformation neural networks;
applying the optical sensor measurements to the candidate reverse optical data transformation neural network to yield simulated synthetic data;
applying the simulated synthetic data to the candidate forward optical data transformation neural network to yield simulated optical measurement data; and
selecting the simulated synthetic data as the synthetic data based on a prediction error between the simulated optical measurement data and the optical sensor measurements.

3. The method of claim 2, wherein if the prediction error is equal to or less than a threshold, the simulated synthetic data is selected as the synthetic data for determining the one or more physical properties of the fluid.

4. The method of claim 2, wherein if the prediction error is more than a threshold, the method further comprises:
iteratively selecting further candidate reverse optical data transformation neural networks and candidate forward optical data transformation neural networks and repeating steps of applying the optical sensor measurements, applying the simulated synthetic data and selecting the simulated synthetic data until the prediction error is equal to or less than the threshold.

5. The method of claim 1, wherein the adaptive model comprises a fluid characterization neural network and an optical data transformation neural network; and the synthetic data is applied as input to a pre-calibrated fluid characterization neural network to receive, as output the one or more physical properties of the fluid.

6. The method of claim 5, wherein the adaptive model is pre-calibrated in a laboratory setting.

7. The method of claim 6, wherein pre-calibrating the adaptive model comprises calibrating the optical data transformation neural network.

8. The method of claim 7, wherein the pre-calibrating comprises applying a progressive modeling to calibrate forward and reverse optical data transformation neural networks.

9. The method of claim 1, wherein the optical data transformation is a forward optical data transformation.

10. The method of claim 5, wherein the fluid characterization neural network had two hidden layers and the optical data transformation neural network has a single hidden layer.

11. A device, comprising:
memory having computer-readable instructions stored therein; and
one or more processors configured to execute computer-readable instructions to:
apply a subset of synthetic optical measurements to an optical data transformation of an adaptive model to identify predicted optical sensor responses;
apply the predicted optical sensor responses to identify predicted synthetic optical measurements;
generate calibration data for calibrating the optical data transformation of the adaptive model based on a comparison of the predicted synthetic optical measurements and the subset of synthetic optical measurement responses;
receive optical sensor measurements generated by one or more downhole optical sensors in a wellbore;
determine synthetic data for fluid characterization using an adaptive model and the optical sensor measurements; and apply the synthetic data to determine one or more physical properties of a fluid in the wellbore for which the optical sensor measurements are received.

12. The device of claim 11, wherein the one or more processors are configured to further execute the computer-readable instructions to:
select, as the adaptive model, a candidate reverse optical data transformation neural network and a candidate forward optical data transformation neural network from a model base of optical data transformation neural networks;
apply the optical sensor measurements to the candidate reverse optical data transformation neural network to yield simulated synthetic data;
apply the simulated synthetic data to the candidate forward optical data transformation neural network to yield simulated optical measurement data; and
select the simulated synthetic data as the synthetic data based on a prediction error between the simulated optical measurement data and the optical sensor measurements.

13. The device of claim 12, wherein if the prediction error is equal to or less than a threshold, the simulated synthetic data is selected as the synthetic data for determining the one or more physical properties of the fluid.

14. The device of claim 12, wherein if the prediction error is more than a threshold, the one or more processors are configured to further execute the computer-readable instructions to:
iteratively select further candidate reverse optical data transformation neural networks and candidate forward optical data transformation neural networks and repeat steps of applying the optical sensor measurements, applying the simulated synthetic data and selecting the simulated synthetic data until the prediction error is equal to or less than the threshold.

15. The device of claim 11, wherein
the adaptive model comprises a fluid characterization neural network and an optical data transformation neural network; and
the synthetic data is applied as input to a pre-calibrated fluid characterization neural network to receive, as output the one or more physical properties of the fluid.

16. The device of claim 15, wherein the adaptive model is pre-calibrated in a laboratory setting.

17. The device of claim 16, wherein the one or more processors are configured to further execute the computer-readable instructions to pre-calibrate the adaptive model by calibrating the optical data transformation neural network.

18. The device of claim 17, wherein the one or more processors are configured to further execute the computer-readable instructions to apply a progressive modeling to calibrate forward and reverse optical data transformation neural networks.

19. The device of claim 11, wherein
the optical data transformation is a forward optical data transformation.

20. The device of claim 11, wherein the one or more optical sensors are communicatively coupled to the device.

21. The device of claim 11, wherein the adaptive model can be at least one of a concatenated neural network, a genetic algorithm, an evolutionary method, a reinforcement learning, a bootstrap aggregating, a temporal difference learning, a w-net, or a growing self-organizing map.

* * * * *